3,047,570
C-12-SUBSTITUTED PROGESTERONE
Otto Halpern, Mexico City, Mexico, assignor, by mesne assignments, to Syntex Corporation, a corporation of Panama
No Drawing. Filed Feb. 10, 1961, Ser. No. 88,259
9 Claims. (Cl. 260—239.57)

The present invention relates to novel cyclopentanophenanthrene compounds and to a novel process for the preparation thereof.

More particularly the present invention relates to steroidal compounds having a side chain at C-12 and more specifically relates to steroidal compounds of the pregnane series having a hydroxyl group at C-17α and an acid or ester side chain moiety at C-12 and to lactones thereof.

The novel compounds which are valuable diuretic compounds having CNS depressant and cardiac activity are represented by the following formulas:

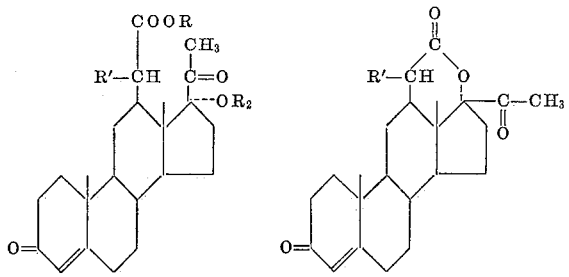

In the above formulas R and $R^1$ represent hydrogen or a lower alkyl group and $R^2$ represents a hydrogen or an acyl radical containing up to 12 carbon atoms.

The novel compounds of the present invention are prepared by a method illustrated by the following equation:

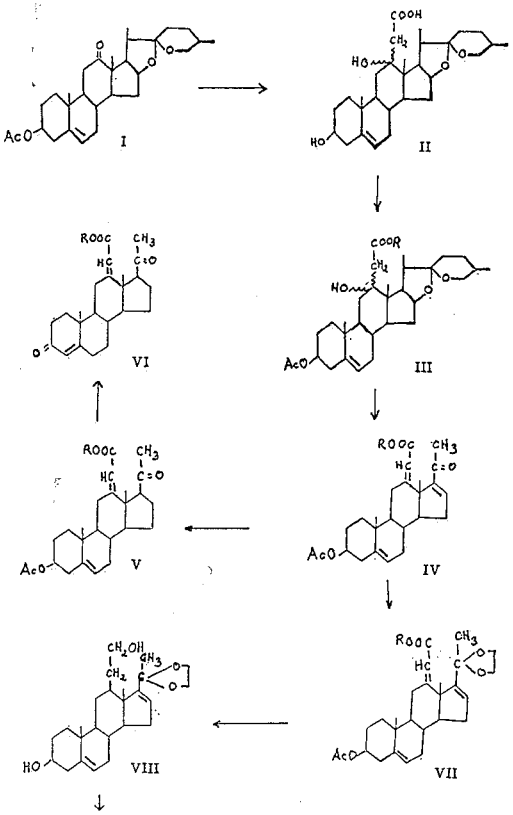

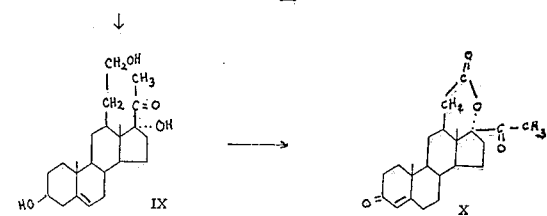

In the above formulas R represents hydrogen or a lower alkyl group and Ac represents the acyl radical of a hydrocarbon carboxylic acid containing from 1 to 12 carbon atoms.

The wavy line at C-12 indicates a generic expression for the α and β steric configurations.

In practicing the process outlined above, botogenin acetate (I) is refluxed in a solvent such as anhydrous benzene for 2 to 3 hours with zinc and an ester of an α-halo carboxylic acid such as for example α-bromoacetic acid. The reaction product is washed with acid and then saponified as by boiling with dilute methanolic potassium carbonate for 6–8 hours. The crude acidic material (II) is then esterified as by treatment with excess ethereal diazoalkane or by the Fischer method, then acylated, preferably acetylated with acetic anhydride in pyridine solution on the steam bath for one hour to form the C-12 isomeric hydroxy esters represented by Formula III. Degradation of the spiroketal side chain is then effected by conventional procedure as by reaction with acetic anhydride at about 200°, oxidation of the resulting pseudo compound to the diosone followed by alkaline hydrolysis, esterification with a diazoalkane and acylation in pyridine solution to thus form 12-carboalkoxymethylene-$\Delta^{5,16}$-pregnadien-3β-ol-20-one acylate (IV). The C-20 keto group is then protected by reaction with ethylene glycol in the presence of p-toluenesulfonic acid to form the cyclic ethylene ketal (VII). Selective reduction of the C-12 exocyclic bond is then effected with concomitant reduction of the carboalkoxy group at C-12 and hydrolysis of the ester group at C-3 by reaction with lithium in liquid ammonia, thus producing the 20-cyclic ethylene ketal of 12β-hydroxyethyl-$\Delta^{5,16}$-pregnadien-3β-ol-20-one (VIII). The ketal group is hydrolyzed by reaction with perchloric acid in tetrahydrofuran and there is regenerated the C-20 keto group thus affording 12β-hydroxyethyl-$\Delta^{5,16}$-pregnadien-3β-ol-20-one.

For introduction of a hydroxyl group at C-17α, the 16,17-double bond is first epoxidized, preferably by reaction with aqueous alkaline peroxide; the resulting 16,17-epoxide is reacted with hydrogen bromide to form the 16β-bromo-17α-hydroxy grouping which upon treatment with hydrogen in a solvent such as methanol and in the presence of ammonium acetate and a palladium catalyst results in reductive debromination and there is formed 12β - hydroxyethyl - $\Delta^5$ - pregnene - 3β,17α - diol - 20-one (IX). Upon subjecting the latter compound to Jones oxidation, the 3β-hydroxy group is oxidized to the keto group and the 12-hydroxyethyl group is oxidized to the acid. The resulting 3-keto 12-acetic acid compound is treated with a strong mineral acid, such as hydrochloric acid in acetic acid solution to effect formation of the lactone ring with concomitant shifting of the double bond to C-4,5 thus producing the C-12,17α-lactone of 12-carboxymethyl-17α-hydroxy-progesterone [C-12,17α-lactone of $\Delta^4$-pregnen-17α-ol-3,20-dione-12-acetic acid (X)].

Alternatively, the 3-keto compound obtained after Jones oxidation is treated with oxalic acid in methanol solution, to produce the α,β unsaturated ketone, namely 12β-carboxymethyl-$\Delta^4$-pregnen-17β-ol-3,20-dione, and this compound treated with a strong mineral acid, acid anhydride or chloride to effect formation of the lactone ring.

In another aspect of the present invention 12-carboalkoxymethylene-$\Delta^{5,16}$-pregnadien-3$\beta$-ol-20-one acylate (IV) is catalytically reduced at C-16 to yield 12-carboalkoxymethylene-$\Delta^5$-pregnen-3$\beta$-ol-20-one acylate (V). Upon saponification followed by oxidation of the 3$\beta$-hydroxy group, there is formed the 12-carboxymethylene derivative of progesterone (VI).

The novel compounds of the present invention are also prepared by a method illustrated by the following equation:

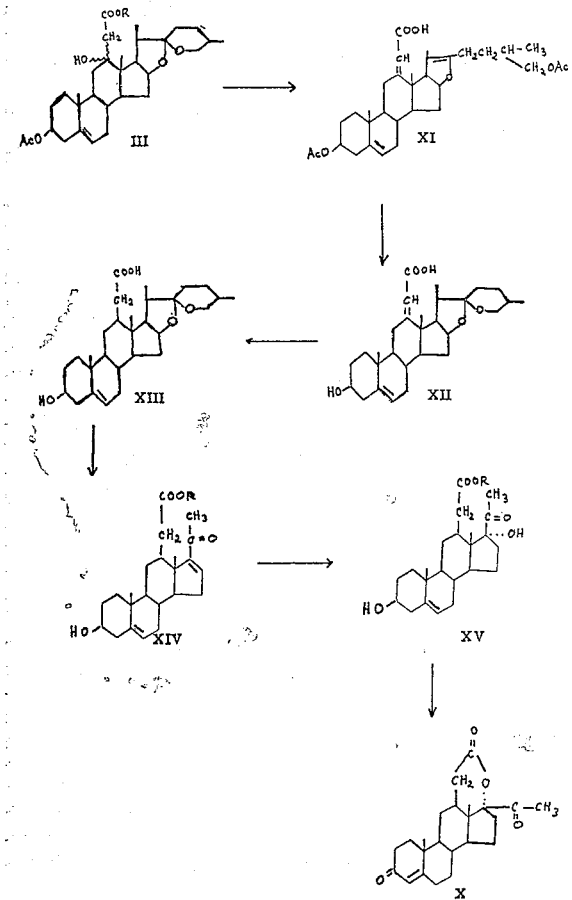

In the above equation R has the same meaning as previously set forth.

In practicing the process outlined above, the C-12 isomeric hydroxy esters (III) are heated with acetic anhydried in a sealed tube at about 200° C. to form the carboxymethylene derivative (XI). The latter is then treated with dilute methanolic potassium hydroxide solution to afford the 12-carboxymethylene derivative of $\Delta^5$-22a-spirosten-3$\beta$-ol (XII) which upon reduction under Birch conditions is converted into 12$\beta$-carboxymethyl-$\Delta^5$-22a-spirosten-3$\beta$-ol (XIII). Degradation of the spiroketal side chain as described previously affords 12$\beta$-carboxymethyl-$\Delta^{5,16}$-pregnadien-3$\beta$-ol-20-one (XIV) which upon esterification with a diazoalkane affords the 12$\beta$-carboalkoxymethyl-$\Delta^{5,16}$-pregnadien-3$\beta$-ol-20-one derivative. A hydroxy group is then introduced at C-17$\alpha$ in the same manner described above to form the 12$\beta$-carboxymethyl or 12$\beta$-carboalkoxymethyl-$\Delta^5$-pregnen-3$\beta$,17$\alpha$-diol - 20 - one (XV). Upon oxidation with chromic acid there is formed the 12$\beta$-carboxymethyl or 12$\beta$-carboalkoxymethyl-$\Delta^5$-pregnen-17$\alpha$-ol-3,20-dione which upon treatment with acid as set forth previously is transformed into the 12$\beta$, 17$\alpha$ - lactone of $\Delta^4$-pregnen-17$\alpha$-ol-3,20-dione-12-acetic acid (X).

Other $\alpha$-halogenated esters such as, for example, the esters of $\alpha$-chloro or $\alpha$-iodo propionic acid, $\alpha$-bromobutyric acid, $\alpha$-bromocaproic acid are employed instead of $\alpha$-bromoacetic acid to form the corresponding 12-carboxylic acid derivative.

The following examples serve to illustrate but are not intended to limit the scope of the present invention:

Example I

To a solution of 50 g. of botogenin acetate in 500 cc. of absolute benzene were added 75 cc. of bromoacetic acid and 75 g. of iodine-activated zinc granules. The mixture was refluxed for 3 hours, evaporated and taken up in ether. The ether layer was washed with 2 N HCl, water, sodium bicarbonate solution and finally with water to neutral, dried over anhydrous sodium sulfate and evaporated to dryness; the residue was dissolved in 700 cc. of methanol, treated with 150 g. of potassium carbonate previously dissolved in 300 cc. of water and the reaction mixture was refluxed for 8 hours, the methanol was then evaporated under vacuo and the aqueous suspension diluted with water, extracted with ether several times, and acidified, to precipitate a mixture of the 12$\alpha$ and 12$\beta$-hydroxy acids, that was collected by filtration.

The above crude acidic material was refluxed for 3 hours with 100 cc. of methanol containing 3.6 cc. of sulfuric acid, diluted with water, the methanol evaporated under vacuo, and the product extracted several times with ether, the organic extract was washed then with 5% sodium bicarbonate solution and water to neutral, dried over anhydrous sodium sulfate and evaporated to dryness. The residue was dissolved in 50 cc. of pyridine and 50 cc. of acetic anhydride and the mixture heated for 1 hour on the steam bath, poured into ice water and stirred for 30 minutes to hydrolyze the excess of anhydride. It was then extracted with ethyl acetate, the organic extract washed well with water, dried and evaporated to dryness, the residue consisting of a mixture of the 12-isomeric hydroxy esters, namely 12$\alpha$-carbomethoxymethyl-$\Delta^5$-22a-spirosten-3$\beta$,12$\beta$-diol-3 acetate and 12$\beta$-carbomethoxymethyl-$\Delta^5$-22a-spirosten-3$\beta$,12$\alpha$-diol 3-acetate, was purified by filtration on washed alumina in benzene solution.

Example II 10 g. of the above mixture of hydroxyesters was heated for 5 hours in a sealed tube, at 195° C., with 40 cc. of acetic anhydride. The contents of the tube were then transferred to an Erlenmeyer, 10 cc. of water was added cautiously, and heated for half an hour on the steam bath to decompose the excess of anhydride. The solution was cooled to about 15° C. and treated under stirring with 50 cc. of a precooled solution of chromium trioxide in 90% acetic acid (prepared by dissolving 4.2 g. of chromium trioxide in 54.5 cc. of 90% acetic acid). The reaction mixture was stirred for 30 minutes further, the excess of reagent was destroyed with sodium bisulfite solution and the mixture poured into water, extracted with ethyl acetate, the extracts washed with water, sodium bicarbonate solution and water to neutral, dried and evaporated to dryness. The residue was refluxed for 1 hour with a mixture of 250 cc. of t-butanol and 100 cc. of 20% aqueous potassium hydroxide, it was then poured into water, extracted well with ethyl acetate, the aqueous layer acidified and reextracted also with ethyl acetate. The acid extract was dried and evaporated to dryness thus giving the crude 12-carboxymethylene-$\Delta^{5,16}$-pregnadien-3$\beta$-ol-20-one.

Esterification of this compound with an excess of diazomethane or by the Fischer method, in accordance with the procedure of Example I, gave 12-carbomethoxymethylene-$\Delta^{5,16}$-pregnadien-3$\beta$-ol-20-one.

500 mg. of the crude ester was acetylated with 2 cc. of pyridine and 1 cc. of acetic anhydride in the usual manner (1 hour on the steam bath). Chromatography of the crude reaction product on neutral alumina gave the acetate of 12-carbomethoxymethylene-$\Delta^{5,16}$-pregnadien-3$\beta$-ol-20-one, M.P. 169–71° C.; $\lambda$ max 228 m$\mu$ log. 4.28.

This compound exhibited anti-androgenic, anti-estrogenic and anti-ovulatory activity as well as gonadotrophin suppression.

*Example III*

A suspension of 500 mg. of the above compound in 60 cc. of ethylene glycol was treated with 40 mg. of p-toluenesulfonic acid and the mixture heated in an oil bath to approximately 90° C. under high vacuum. After 5 hours the homogeneous solution was concentrated to approximately 10 cc. by heating to about 120° C. under high vacuum. The concentrate was poured into dilute aqueous sodium bicarbonate solution, extracted with ethyl acetate and the organic extract washed to neutrality, dried over anhydrous sodium sulfate and evaporated to dryness, thus producing 20-ethylenedioxy-12-carbomethoxymethylene-$\Delta^{5,16}$-pregnadien-3$\beta$-ol-3-acetate that was not further purified.

The above crude compound was dissolved in 4 cc. of anhydrous dioxane and 4 cc. of anhydrous ether and added dropwise to a solution of lithium in liquid ammonia in such a way that the solution remains blue throughout the addition; after stirring another minute or two, the blue color was discharged by adding solid ammonium chloride. The ammonia was then evaporated and the residue taken up in water and extracted with ethyl acetate. After washing with dilute hydrochloric acid and water to neutral, the organic extract was dried and evaporated under reduced pressure, thus giving the 20-ethylene ketal of 12$\beta$-hydroxyethyl-$\Delta^{5,16}$-pregnadien-3$\beta$-ol-20-one.

The above compound was disolved in 10 cc. of tetrahydrofuran and treated with 4 cc. of 3 N perchloric acid, the reaction mixture was kept at room temperature for 3 hours, poured into water, extracted with methylene chloride and the organic extract washed with water to neutral, dried over anhydrous sodium sulfate and evaporated to dryness. Chromatography of the residue afforded the pure 12$\beta$-hydroxyethyl-$\Delta^{5,16}$-pregnadien-3$\beta$-ol-20-one.

*Example IV*

A solution of 0.4 g. of the latter compound in 16 cc. of methanol was treated at 0° C. with 1 cc. of 35% hydrogen peroxide and 0.4 g. of potassium hydroxide previously dissolved in 1.6 cc. of water and the mixture kept at 0° C. overnight, diluted with ice-salt water, and extracted several times with ether. The combined extracts were washed with water to neutral, dried over anhydrous sodium sulfate and evaporated to dryness. Crystallization from acetone-hexane gave 12$\beta$-hydroxyethyl-16$\alpha$,17$\alpha$-oxido-$\Delta^5$-pregnen-3$\beta$-ol-20-one.

The preceding 16,17-epoxide, dissolved in 10 cc. of acetic acid, was treated at room temperature and while stirring, with 0.1 cc. of a saturated solution of hydrobromic acid in glacial acetic acid. After half an hour it was poured into water, the precipitate was filtered and washed with water to neutrality. Thus there was obtained 16$\beta$-bromo-12$\beta$-hydroxyethyl - $\Delta^5$ - pregnene-3$\beta$,17$\alpha$-diol-20-one.

The above bromohydrin was dissolved in 15 cc. of methanol and stirred overnight with 300 mg. of 2% palladium on calcium carbonate and 10 mg. of ammonium acetate under an atmosphere of hydrogen. The suspension was filtered through celite, the filter was washed with hot methanol, the washings and filtrate were combined and then evaporated to dryness. By crystallization from methanol there was obtained 12$\beta$-hydroxyethyl-$\Delta^5$-pregnene-3$\beta$,17$\alpha$-diol-20-one which exhibited anti-androgenic, anti-estrogenic and progestational activity as well as suppression of the gonadotrophic hormone.

*Example V*

1 g. of 12$\beta$-hydroxyethyl-$\Delta^5$-pregnene-3$\beta$,17$\alpha$-diol-20-one was dissolved in 50 cc. of acetone, cooled to 0° C., flushed with nitrogen and treated under stirring with an 8 N chromic acid solution added in a thin stream at 0° C., until the red color of chromium trioxide persisted in the mixture. (The 8 N solution of chromic acid was prepared by dissolving 26.7 g. of chromium trioxide in 23 cc. of concentrated sulfuric acid and diluting with water to 100 cc.) The reaction mixture was stirred for 5 minutes further, diluted with water and the product collected by filtration, washed with water and dried under vacuum. There was thus obtained 12$\beta$-carboxymethyl-$\Delta^5$-pregnen-17$\alpha$-ol-3,20-dione.

Through a suspension of 500 mg. of the foregoing compound in 10 ml. of glacial acetic acid there was passed a current of dry hydrogen chloride for 4 hours at 15° C., the resulting solution was then poured into ice-water, the solid collected by filtration, washed with water, dried and evaporated to dryness. Chromatography of the residue on neutral alumina, followed by recrystallization of the solid eluates from acetone-hexane gave the pure 12$\beta$,17$\alpha$-lactone of $\Delta^4$- pregnen-17$\alpha$-ol-3,20-dione-12-acetic acid.

*Example VI*

A solution of 1.25 g. of 12-carbomethoxymethylene-$\Delta^{5,16}$-pregnadien-3$\beta$-ol-20-one acetate in 50 cc. of ethyl acetate was hydrogenated at room temperature and atmospheric pressure using 200 mg. of prereduced 10% palladium on charcoal catalyst, until 1 molar equivalent of hydrogen was absorbed; the catalyst was filtered and the filtrate evaporated to a small volume. Addition of methanol gave the crystalline 12-carbomethoxymethylene-$\Delta^5$-pregnen-3$\beta$-ol-20-one acetate.

A solution of 1 g. of the above compound in 25 cc. of 2.5% methanolic solution of perchloric acid was kept at room temperature for 18 hours, it was then diluted with water, the formed precipitate collected by filtration, washed with water, dried and recrystallized from acetone-hexane, thus giving 12-carboxymethylene-$\Delta^5$-pregnen-3$\beta$-ol-20-one.

The above compound was oxidized with 8 N chromic acid in acetone solution, in accordance with the method of the preceding example to produce 12-carboxymethylene-$\Delta^5$-pregnene-3,20-dione.

The crude product was dissolved in 40 cc. of methanol and treated at room temperature with a solution of 0.1 g. of oxalic acid in 1 cc. of water. The mixture was kept standing for 3 hours, then diluted with water and the product was collected by filtration, washed with water to neutral and dried. There was thus obtained 12-carboxymethylene-$\Delta^4$-pregnene-3,20-dione.

Upon esterification of the above compound with diazomethane in methylene chloride solution there was obtained the corresponding 12-carbomethoxymethylene-$\Delta^4$-pregnene-3,20-dione.

*Example VII*

5 g. of the mixture of hydroxyesters obtained as described in Example I was heated with 20 cc. of acetic anhydride in a sealed tube at 195° C. for 5 hours; cooled, and the contents of the tube transferred to an Erlenmeyer; the excess of anhydride was hydrolyzed by the addition of 8 cc. of water, the mixture stirred for 30 minutes, extracted with ethyl acetate, washed with water to neutral, dried and evaporated to dryness under vacuo. The resulting oil was dissolved in 50 cc. of 5% methanolic potassium hydroxide solution and the mixture refluxed for 1 hour, cooled, acidified with hydrochloric acid and extracted several times with ethyl acetate, the organic solution was washed with water, dried and evaporated to dryness. There was thus obtained the 12-carboxymethylene derivative of $\Delta^5$-22a-spirosten-3$\beta$-ol.

The above compound was dissolved in 30 cc. of anhydrous ether and 30 cc. of anhydrous dioxane and reduced with lithium in liquid ammonia, in accordance with the method of Example III. After evaporation of the ammonia and dilution with water, the mixture was acidified with hydrochloric acid and extracted with ethyl acetate, the organic solution was washed with water, dried and evaporated to dryness, thus affording 12β-carboxymethyl-Δ⁵-22a-spirosten-3β-ol.

2 g. of the above compound was dissolved in 20 cc. of methanol, 0.72 cc. of sulfuric acid was added and the mixture refluxed for 3 hours, diluted with water, the product extracted with ethyl acetate, and the combined extractions washed with 5% sodium bicarbonate solution and water to neutral, dried and evaporated to dryness under reduced pressure.

The resulting 12-carbomethoxymethyl-Δ⁵-22a-spirosten-3β-ol was subjected to the sapogenin degradation method described in Example II to yield 12β-carboxymethyl-Δ⁵,¹⁶-pregnadien-3β-ol-20-one (Δ⁵,¹⁶-pregnadien-3β-ol-20-one-12β-acetic acid).

0.5 g. of the foregoing compound was dissolved in 10 cc. of 5% aqueous potassium hydroxide solution, cooled to 0° C. and treated with 1.25 cc. of 35% hydrogen peroxide. The mixture was kept at room temperature overnight, diluted with water, acidified with hydrochloric acid and extracted several times with ether, the extract was washed with water, dried and evaporated to dryness, thus producing the 12β-carboxymethyl-16α,17α-oxido-Δ⁵-pregnen-3β-ol-20-one.

Further treatment with hydrobromic acid in acetic acid, followed by hydrogenation of the resulting bromohydrin, in accordance with the method of Example IV, gave 12β-carboxymethyl-Δ⁵-pregnene-3β,17α-diol-20-one.

Oxidation of the above compound with 8 N chromic acid in acetone solution, by following the method described in Example V, gave 12β-carboxymethyl-Δ⁵-pregnen-17α-ol-3,20-dione identical with the compound obtained in such example.

*Example VIII*

1 g. of the latter compound was treated with oxalic acid in methanol solution, by following the method of Example VI, thus producing 12β-carboxymethyl-Δ⁴-pregnen-17α-ol-3,20-dione. Upon treatment with dry hydrogen chloride in acetic acid, in accordance with the method of Example V there was obtained the 12β,17α-lactone of Δ⁴-pregnen-17α-ol-3,20-dione-12-acetic acid, identical with that obtained in such example.

*Example IX*

A solution of 1 g. of 12β-carboxymethyl-Δ⁴-pregnen-17α-ol-3,20-dione in 10 cc. of methylene chloride was treated with an ethereal solution of diazomethane to give 12β-carbomethoxymethyl-Δ⁴-pregnen-17α-ol-3,20-dione.

The above compound was dissolved in 50 cc. of benzene and treated with 2 cc. of acetic anhydride and 1 g. of p-toluenesulfonic acid; the mixture was kept at room temperature for 48 hours, washed well with water, sodium carbonate solution and water to neutral, dried over anhydrous sodium sulfate and evaporated to dryness; by chromatography of the residue on neutral alumina and recrystallization of the solid eluates from acetone-hexane, there was obtained 12β-carbomethoxymethyl-Δ⁴-pregnen-17α-ol-3,20-dione acetate.

In a similar manner, but using propionic, caproic or cyclopentylpropionic anhydride there were produced the corresponding 17-esters of 12β-carbomethoxymethyl-Δ⁴-pregnen-17α-ol-3,20-dione.

I claim:
1. A compound of the following formula:

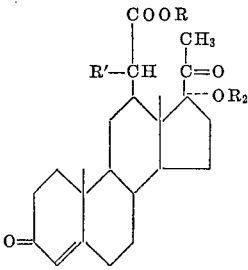

wherein R and R¹ are selected from the group consisting of hydrogen and a lower alkyl group and R² is selected from the group consisting of hydrogen and an acyl radical of up to 12 carbon atoms.

2. Δ⁴-pregnen-17α-ol-3,20-dione-12β-acetic acid.
3. A compound of the following formula:

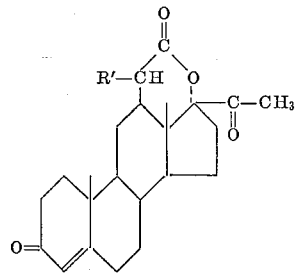

wherein R¹ is selected from the group consisting of hydrogen and a lower alkyl group.

4. The 12,17α-lactone of Δ⁴-pregnen-17α-ol-3,20-dione-12β-acetic acid.

5. A compound of the following formula:

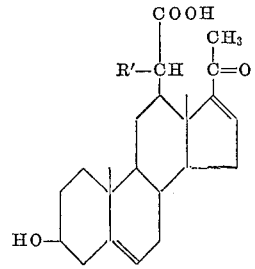

wherein R¹ is selected from the group consisting of hydrogen and a lower alkyl group.

6. Δ⁵,¹⁶-pregnadien-3β-ol-20-one-12β-acetic acid.
7. 12-carboxymethylene-Δ⁵,¹⁶-pregnadien-3β-ol-20-one.
8. 12-carboxymethylene-Δ⁴-pregnene-3,20-dione.
9. 12β-hydroxyethyl-Δ⁵-pregnene-3β,17α-diol-20-one.

No references cited.